United States Patent [19]

Saeki et al.

[11] 3,855,146

[45] Dec. 17, 1974

[54] PROCESS FOR PREPARING MICROSCOPIC CAPSULES CONTAINING HYDROPHOBIC OIL DROPLETS THEREIN

[75] Inventors: Keiso Saeki; Hiroharu Matsukawa, both of Shizuoka, Japan

[73] Assignee: Fuji Photo Film Co., Ltd., Kanagawa, Japan

[22] Filed: Feb. 29, 1972

[21] Appl. No.: 230,465

[30] Foreign Application Priority Data

Mar. 3, 1971 Japan.............................. 46-11077
Mar. 12, 1971 Japan.............................. 46-13361
Apr. 28, 1971 Japan.............................. 46-28383

[52] U.S. Cl.............. 252/316, 117/36.2, 117/62.2, 117/100 A, 264/4
[51] Int. Cl........................... B01j 13/02, B44d 1/44
[58] Field of Search................ 252/316; 117/100 A; 264/4; 424/33

[56] References Cited
UNITED STATES PATENTS

| | | | |
|---|---|---|---|
| 2,800,457 | 7/1957 | Green et al........................ | 252/316 |
| 2,651,883 | 9/1953 | Hedrick et al. ......... | 117/100 A UX |
| 3,043,782 | 7/1962 | Jensen ................................ | 252/316 |
| 3,577,516 | 5/1971 | Gould et al...................... | 424/33 X |
| 3,687,865 | 8/1972 | Katayama et al.................. | 252/316 |

Primary Examiner—Richard D. Lovering
Attorney, Agent, or Firm—Sughrue, Rothwell, Mion, Zinn & Macpeak

[57] ABSTRACT

In a process for preparing microscopic capsules containing hydrophobic oil droplets therein comprising (1) emulsifying a water-immisicible oil in an aqueous solution of a hydrophilic colloid which is ionizable in water to obtain a first sol (2) mixing said first sol with an aqueous solution of a hydrophilic colloid which is ionizable in water and has an electric charge opposite to that of said first sol, one of said colloids being positively charged (3) adding water thereto or adjusting the pH thereof to obtain coacervates wherein complex colloids are deposited around individual oil droplets (4) cooling to gel the resulting coacervates (5) adjusting the pH thereof to 9 to 11, and (6) hardening said coacervate, the improvement comprising adding, prior to step (4), to said sol containing gelatin (a) a vinyl acetate-maleic acid copolymer, (b) a polyvinylbenzene sulfonate or vinyl benzene sulfonate copolymer, or (c) an acrylic acid or methacrylic acid copolymer or the salts thereof, is described herein. The added compound (a), (b) or (c) is used in an amount sufficient to induce coacervation without becoming a predominant part of the main wall membrane of the microcapsules, and leads to microcapsules having a thick wall membrane and a low degree of porosity.

19 Claims, No Drawings

PROCESS FOR PREPARING MICROSCOPIC CAPSULES CONTAINING HYDROPHOBIC OIL DROPLETS THEREIN

BACKGROUND OF THE INVENTION

1. Field of the Invention

This invention relates to a process for preparing microcapsules containing hydrophobic oil droplets therein. More particularly, it relates to a process for preparing microscopic capsules in a highly concentrated colloidal system by adding a vinyl acetate-maleic acid copolymer or a derivative thereof, a polymer or copolymer of vinylbenzene sulfonate, or a copolymer of acrylic acid or methacrylic acid or the salts thereof, to a solution of two or more kinds of hydrophilic colloids including a positively charged colloid to establish conditions which would generally be insufficient for coacervation, i.e., using a relatively small quantity of water, in encapsulating hydrophobic oil droplets with hydrophilic wall membrane by complex coacervation.

This process makes it possible to lower the equivalent amount of the negative electrolyte used for coacervation together with gelatin and to deposit the wall membrane effectively around hydrophobic oil droplets and to prepare microscopic capsules encapsulated with a thick wall membrane having a low degree of porosity.

2. Description of the Prior Art

A process for preparing oil-containing microscopic capsules employing complex coacervation is disclosed in the specification of U.S. Pat. No. 2,800,457. This process includes about four steps; (1) emulsifying a water-immiscible oil in a solution of a hydrophilic colloid (first sol) which is ionizable in water (emulsifying process), (2) mixing said emulsion with a hydrophilic sol which is ionizable in water and has an electric charge opposite to that of the first sol colloid and causing coacervation by adding water or by adjusting the pH thereof to deposit a complex colloid around each of the oil droplets (coacervation process), (3) cooling the resulting coacervate to gel (gelatin process), and (4) adjusting the pH thereof to 9–11 and introducing a hardener (hardening pretreatment). This process for encapsulating a hydrophobic oil is by the combination of two kinds of colloid material each with an opposite electric charge, for example, the combination of a positively charged colloid material such as gelatin, casein, albumin, fibrinogen, etc., and a negatively charged colloid material such as gum arabic, carboxymethyl cellulose, cellulose phthalate, etc.

The microscopic capsules thus obtained by using this complex coacervation of the gelatin-gum arabic system as hydrophilic colloids are satisfactory only for limited applications.

The conditions of this complex coacervation are determined by the colloid concentration, pH, colloid ratio and temperature. The amount of coacervate deposited is at a maximum at the optimum pH, at a temperature within a suitable range and at the optimum colloid ratio, but, when these conditions deviate from the optimum conditions, coacervation is increasingly more difficult, and the amount of coacervate deposited decreases. With respect to colloid concentration, the condition becomes more and more suitable for coacervation and the amount of coacervate deposited increases in proportion to the lowering of the colloid concentration. Conversely, in a system of higher colloid concentration, the conditions become insufficient for coacervation, and the amount of coacervate deposited decreases.

In the complex coacervation of the above described two kinds of colloid materials each with an opposite electric charge, i.e., the gelatin-gum arabic system, the electrolyte strength of the negatively charged gum arabic is small in comparison with that of the positively charged gelatin, and electrical interaction between them is weak. Therefore, the amount of the complex coacervate deposited is small and the microscopic capsules thus obtained have thin wall membranes with fairly high porosity.

In addition, as is described before, the electrolyte strength of gum arabic is so small that, from a quantitative point, it must be used in an amount almost equal to the gelatin.

SUMMARY OF THE INVENTION

This invention relates to an improvement in the process for preparing microscopic capsules by the complex coacervation method using any system of positive-negative colloids preferably a gelatin negatively charged colloid system, the gelatin gum arabic system in particular, which comprises adding a compound of this invention which is a vinyl acetate-maleic acid copolymer or a derivative thereof, a polymer or copolymer of vinylbenzenesulfonate, or a copolymer of acrylic acid or methyacrylic acid and the salts thereof, to a system of two or more hydrophilic colloids including a positively charged colloid.

That is, with this invention the formation of a microcapsule wall can be obtained even under conditions which would be more than insufficient for the coacervation of such a system, for example, the gelatin-gum arabic system above. This invention is accomplished by applying the compound of this invention to such a system, for example, a conventional gelatin-gum arabic system, whereby a thick capsule wall can be obtained. The compounds used in this invention (a) vinylacetate-maleic acid copolymers or derivatives thereof, of the general formula (I)

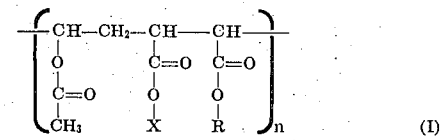

wherein R represents a hydrogen atom, an alkyl group, preferably having 1 to about 4 carbon atoms, such as an ethylgroup or an alkali metal atom, and X represents a hydrogen atom (except when R is an alkyl group) or an alkali metal atom, such as a sodium or potassium ion. $n$ represents the degree of polymerization and ranges such that the average molecular weight of the copolymer is, from about 500 to about 500,000; (b) polyvinyl benzene sulfonates of the general formula (II)

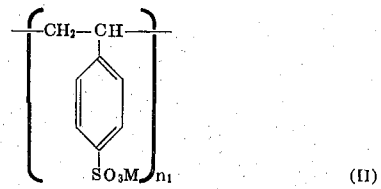

wherein M represents an alkali metal atom such as a potassium atom or a sodium atom and wherein $n_1$ represents the degree of polymerization and ranges such that the average molecular weight of the copolymer is from about 10,000 to about 3 million, or a copolymer of vinylbenzenesulfonate and acryloylmorpholine, morpholinoalkyl acrylamide, acrylamide, vinylpyrrolidone or alkoxyalkyl acrylamide; and (c) copolymers of acrylic acid or methacrylic acid (or the salts thereof) and acryloyl morpholine, morpholinoalkyl acrylamide, acrylamide, vinylpyrrolidone or alkoxyalkyl acrylamide.

The average molecular weight of the vinylacetate-maleic acid copolymer and derivatives thereof may be in the range of from about 500 to about 500,000, preferably from about 5,000 to about 300,000.

The molecular weight of the vinylbenzene sulfonate polymer and copolymer suitable for the objects of this invention ranges from about 10,000 to about 3 million, preferably, about 100,000 to about 1 million. The amount of vinylbenzenesulfonate contained in the copolymer is, preferably, more than about 50% (mol ratio) of the copolymer.

The molecular weight of the copolymers of acrylic acid or methacrylic acid (or salts thereof) ranges from about 6,000 to about 2 million and preferably from about 50,000 to about 1 million. The amount of the acrylic acid or methacrylic acid (or salts thereof) included in the copolymers is preferably more than about 50% (mol ratio).

DETAILED DESCRIPTION OF THE INVENTION

Generally, the compound of this invention has a large electrolyte strength and, when used together with a positively charged colloid, for example, gelatin, it acts usually as a coagulant of gelatin. This invention effectively utilizes this property of using quite a small amount of the compound to the amount of gelatin used. The ability to use such a small amount results in a reduction in the porosity of the resulting wall membrane.

A specific description of the more insufficient conditions in this invention, and the advantages of this invention which enable the encapsulation under insufficient conditions are as follows: (1) Encapsulation can be carried out at a higher colloid concentration. This is an important point in this process, and the amount of capsules produced per process in small tank vessels is increased, which reduces the cost. Because the resulting capsule solution is highly concentrated heating and equipment requirements in the process of comminuting the capsules are reduced because the amount of water to be distilled off is small. (2) The total amount of the negatively charged electrolyte colloid can be reduced to nearly one-half of the amount conventionally used, for example, compared with the conventional coacervation of the gelatin-gum arabic system. It is especially important that the amount of gum arabic used can be reduced to less than one-half, since this results in a large reduction in cost. (3) The degree of porosity of the resulting capsule wall is reduced because the negatively charged electrolyte colloid is used in a small amount, and the applicable concentration range for capsule formation can be extended. (4) Assuming that the amount of oil droplets to be encapsulated is held constant, the quantity of the wall material obtained is greater than that obtained by the prior art using the same amount of colloid. That is, since the thickness of the wall is large, the strength of the capsule is increased. (5) The coacervation can be accomplished at a low temperature, which leads to a reduction in cost because any heating is minimized. (6) That the amount of wall-membrane-forming material is large permits flexibility in the encapsulating process, which is preferred from the standpoint of control.

Therefore, microscopic capsules prepared by this invention have a thicker wall membrane with a small porosity, and have the above-described characteristics in the production thereof.

As described above this invention relates to a process for preparing microcapsules having a thick wall membrane with a small degree of porosity by causing a complex coacervation of conventional known colloid materials in the presence of a compound of this invention in a small amount before the hardening pre-treatment process, which is conventional or well known (hereinafter as described).

In this invention, microscopic encapsulation whereby oil droplets are coated is conducted by complex coacervation resulting from dilution with water and/or adjusting of the pH.

The formation of the complex coacervate based on liquid-liquid phase separation is based on the separation of the combination of at least two kinds of hydrophilic colloids into a colloid rich phase and a colloid poor phase. In complex coacervation, at least two kinds of hydrophilic colloids each with an opposite electric charge are necessary as a coacervation colloid, at least one of the colloids being gellable.

Natural and synthetic products such as gelatin, agar-agar, casein, alginate, gum arabic, carrageenin, etc. are included among the hydrophilic colloid.

Materials which can be used to form the nucleus of each of the capsules are those that occur naturally, such as mineral oils, animal oils, vegetable oils, and the like, and synthetic oils. Examples of mineral oils are petroleum oil and the distilled fractions thereof such as kerosene, gasoline, naphtha and paraffin oil. Examples of animal oils are fish oil and lard oil. Examples of vegetable oils are peanut oil, linseed oil, soybean oil, castor oil, corn oil, and the like. Examples of synthetic oils are biphenyl derivatives such as dichlorobiphenyl and trichlorobiphenyl, phosphoric acid derivatives such a triphenyl phosphate, naphthalene derivatives such as alkyl naphthalenes (e.g., isopropyl naphthalene) phthalate derivatives such as diethylphthalate and dibutyl phthalate and dioctylphthalate, salicylate derivatives such as ethylsalicylate, and the like.

The addition of an anionic, a cationic or a non-ionic surface active agent to the emulsion containing oil droplets to be dispersed as nuclei in water is preferable because these materials prevent phase reversion, i.e., the formation of a water-in-oil emulsion (W/O emulsion). An oil-in-water emulsion can be prepared by emulsifying oil droplets as nuclei in an aqueous solution of hydrophilic colloids at least one of which is to be a wall material.

The resulting emulsion is diluted with water and the pH thereof is adjusted to deposit the coacervate around the emulsified oil droplets. The coacervate deposited on the surface of oil droplets after the coacervation process is cooled from outside the vessel to gel the wall memberane. In order to harden the wall membrane, the addition of, for example, formaldehyde is conducted and the pH of the system is adjusted toward the alkaline side. In addition, heating is used to accelerate the hardening of the capsule wall, thereby the heat resistance of the capsules obtained is strengthened.

The compound of this invention, i.e., the vinyl acetate-maleic acid copolymer or the derivative thereof, the polyvinyl benzenesulfonates and the copolymer of acrylic or methacrylic acid or salts thereof, employed in the process of this invention in a small amount is not used predominantly as a main wall-membrane-forming material, but rather is used as a coacervation-inducing agent which compensates for the low electrolyte strength of the negatively charged colloid material, whereby electric interaction between the colloid materials is strengthened to deposit the complex coacervate more effectively on the surface of the oil droplets.

The combined use of the materials selected from the vinyl acetate maleic acid, the polyvinyl-benzene sulfonates and the acrylic polymers, before the coacervation is induced, increases the amount of binder deposited on the surface of the oil droplets.

As is described before, when hydrophobic oil droplets are subjected to the microscopic encapsulation in a binary system a compound of this invention instead of a negatively charged colloid material, such as gum arabic, together with a positively charged colloid material, such as gelatin, coagulation occurs in the coacervation process due to the large electrolyte strength of said copolymer, with typical capsules not being obtained.

Therefore, the process of this invention involves using a compound of this invention not as a wall-membrance-forming material but as a coacervation-inducing agent in a very small amount to strengthen the electric interaction between at least two kinds of colloids oppositely charged.

The amount of vinyl acetate-maleic acid copolymer to be added in the process of this invention ranges from about one four-hundredth to about one-tenth, preferably about one one one-hundre-sixtieth to about one-thirtieth, by weight, based on the total amount of the hydrophilic colloids (e.g., gelatin and gum arabic).

When more than about one-tenth amount is added, coagulation occurs in the coacervation process.

The amount of the polymer or copolymer of vinylbenzenesulfonate to be added in this invention is about one one-thousandth to one-tenth, preferably about one six-hundredth to about one-thirtieth, of the total amount of the hydrophilic colloids (e.g., gelatin + gum arabic). When more than about one-tenth amount is added, coagulation occurs in the coacervation process.

The amount of the copolymer of acrylic acid or methacrylic acid (or the salts thereof) to be added in the present invention is about one four-hundredth to about one-tenth of the total amount of the hydrophilic colloids (e.g., the positively charged gelatin + the negatively charged gum arabic). A preferred amount is about one one-hundred sixtieth to about one-thirtieth. Addition of more than about one-tenth causes coagulation at the coacervation step.

The effect of the inducing agent, i.e., the vinyl acetate-maleic acid copolymer, used in this invention is described below using, for example, the sodium salt of a vinyl acetate-monoethyl maleate copolymer having an average molecular weight of about 20,000, a potassium polyvinyl benzenesulfonate of an average molecular weight of about 130,000 or a sodium acrylate-acryloyl morpholine copolymer of an average moelcular weight of about 470,000. For comparison with the encapsulating method of dilution with water and pH adjustment as described in the examples in the specification of the U.S. Pat. No. 2,800,457, the complex coacervation of the gelatin-gum arabic system is used, for instance, when the complex coacervation pH is adjusted to 4.5 in a mixture of 12 parts of colloids (6 parts of gelatin and 6 parts of gum arabic) and 210 parts of water, the amount of complex coacervate deposited is 81% with respect to gelatin. But, when the encapsulation is carried out under the same conditions as described above but (1) with the further addition of only 0.15 parts of the vinyl acetatemaleic acid copolymer described above (corresponding to 13% by weight based on the total weight of the colloid materials), the amount of complex coacervate deposited increases to 93% with respect to gelatin, (2) with further adding only 0.05 part of the polyvinylbenzene sulfonate described above (0.4% based on the total weight of the colloid materials the amount of complex coacervate deposited increases to 94% with respect to gelatin, and (3) with the further addition of only 0.15 parts of the sodium acrylate-acryloyl morpholine copolymer described above, the amount of the complex coacervate deposited increases to 90% with respect to gelatin. As a further more marked example, when encapsulation is carried out at a coacervation pH of 4.5 in a mixture of 9 parts of colloids (6 parts of) gelatin and 3 parts of gum arabic) and 180 parts of water reducing the gum arabic amount to one-half, the marked effect of the sodium salt of the vinyl acetate-monoethyl maleate copolymer described above, the polyvinyl benzenesulfonate described above and the sodium acrylate-acryloyl morpholine copolymer described above are shown in the following table.

| Encapsulating Process | Amount of Gelatin Deposited |
|---|---|
| Process described in the specification of the U.S.P. No. 2,800,457 | 65% |
| Process of this invention (adding 0.15 part of the vinyl acetate-maleic acid copolymer corresponding to 1.7% of colloids) | 83% |
| Process of this invention (adding 0.5 part of the polyvinyl benzenesulfonate corresponding to 0.6% of the colloid materials) | 83% |
| Process of this invention (adding 0.15 part of sodium acrylate-acryloyl morpholine copolymer corresponding to 1.7% of colloids) | 80% |

From these results, it can be that the amount of coacervate deposited, which is produced by the complex coacervation with encapsulation caused by the combination of dilution with water and adjustment of pH as described in the specification of the U.S. Pat. No. 2,800,457 using 6 parts of gelatin and 6 parts of gum arabic as wall-membrane-forming materials, is about the same as the amount of coacervate deposited which is produced by the complex coacervation in this invention using 6 parts of gelatin and 3 parts of gum arabic, the gum arabic being reduced by one-half, as wall-membrane-forming materials and adding 0.15 part of sodium salt of the vinyl acetate-monoethyl maleate copolymer, adding 0.05 part of the sodium polyvinyl benzenesulfonate, or adding 0.15 part of sodium acrylate-acryloyl morpholine copolymer. This enables a great reduction in the amount of gum arabic necessary due to the coacervation inducing effect of the compounds of this invention, which leads to a great reduction of cost.

As is described before, by adding in quite a small amount, the compounds of this invention to a mixture of more than two kinds of colloids which are oppositely charged the amount of the colloid materials remaining in the aqueous solution decreases and the amount of the colloid materials used for the coacervate deposition increases to yield microscopic capsules having a thick wall membrane and a low porosity.

The disadvantages of the encapsulation method using coacervation lie in forming capsules which contain multiple oil droplets and using a large amount of time in hardening the wall membrane (for example, more than one day is required in the presence of a hardening agent), etc. It is useful to combine the process of this invention with the processes improving such disadvantages (as described in the specification of German OLS No. 1,939,624). That is, multiple-nuclei capsules consisting of multiple grains can be also optionally prepared as well as mono-nuclear capsules consisting of one grain by a short-time hardening treatment and, by a combining the process of this invention, said object can be accomplished at further higher concentration.

Because, in the hardening pre-treatment, by adding a shockpreventing agent, it is possible to change the pH to the alkaline side immediately under coacervation conditions which are insufficient for preparing mono-nuclear capsules (e.g., under high colloid concentration) in the presence of aldehydes as hardening agents for gelatin.

By the term "shock" as used in this specification, is meant the rapid rise of viscosity which occurs when the pH of the system approximately reaches the isoelectric point of gelatin in conducting the hardening pre-treatment of the coacervation capsule solution containing the gelatin. The term "shock-preventing agent" means a solution which prevents the "shock."

It can be understood from the description given above that the process of this invention is extremely useful for producing microscopic capsules. This invention will be further described in greater detail by the following Examples, but this invention should not be interpreted as limited thereto.

In the following Examples, the heat resistance of capsules was examined by dissolving crystal violet lactone in an oil at the concentration of 2% by weight to the oil, coating the resulting capsules on a base paper and, after conducting the heat resistance testing in a hot-air-drying box, determining whether the surface of a clayed paper was colored or not when a capsule-coated surface was superposed on the surface of a clayed paper.

The clayed paper was prepared by dispersing 100 parts of sulfuric acid-processed acidic terra abla in 300 parts of water containing 6 parts of a 40% aqueous solution of sodium hydroxide and, after dispersing with a homogenizer, adding 40 parts of a styrene-butadiene latex (Trade Mark: Dowlatex, made by the Dow Chemical Co.), then coating with a coating rod in such a way that the solid materials coated therein is 12g/m² on a 50 g/m² base paper. In the following Examples, "parts" are by weight The copolymer composition and the intrinsic viscosity of the copolymer of potassium vinylbenzenesulfonate used in the following Examples are given in Table 1. These copolymers were produced by aqueous solution polymerization in a mixed solvent of water-ethyl alcohol using potassium persulfate, hydrogen peroxide, benzoyl peroxide or the like as an initiator.

Table 1

| Copolymer | Copolymer No. | Mol% of Potassium Vinylbenzenesulfonate in the Copolymer | Intrinsic Viscosity* ($\eta$) (lg/100ml) |
|---|---|---|---|
| Potassium Vinylbenzenesulfonate-acryloyl morpholine Copolymer | 1 | 53.7 | 0.62 |
| Potassium Vinylbenzenesulfonate-acrylamide Copolymer | 2 | 52.8 | 0.98 |
| Potassium Vinylbenzenesulfonate-vinylpyrrolidone Copolymer | 3 | 67.3 | 0.65 |
| Potassium Vinylbenzenesulfonate-morpholinomethylacrylamide Copolymer | 4 | 62.1 | 0.53 |
| Potassium Vinylbenzenesulfonate-methoxymethylacrylamide Copolymer | 5 | 58.5 | 0.41 |

*Intrinsic viscosity is determined at 30°C using a 1 N NaNO₃ as the solvent.

The copolymers of acrylic acid or methacrylic acid (or salts thereof) and the composition and intrinsic viscosity of the copolymers used in the Examples are shown in Table 2 below. These copolymers were obtained by aqueous solution polymerization in a water-ethyl alcohol mixture with using an intiator such as potassium persulfate and benzoyl peroxide.

Table 2

| Copolymer | Copolymer No. | Mol% of Sodium Acrylate in the Copolymer | Intrinsic Viscosity* ($\eta$) (lg/100ml) |
|---|---|---|---|
| Sodium Acrylate-acryloyl Copolymer | 6 | 76.2 | 0.552 |
| Sodium Acrylate-acrylamide Copolymer | 7 | 82.6 | 0.385 |
| Sodium Methacrylate-vinyl Pyrrolidone Copolymer | 8 | 64.7 | 0.534 |
| Sodium Acrylate-merpholinomethyl Acrylamide Copolymer | 9 | 63.5 | 0.641 |
| Sodium Acry- | | | |

Table 2-Continued

| Copolymer | Co-polymer No. | Mol% of Sodium Acrylate in the Copolymer | Intrinsic Viscosity* ($\eta$) (lg/100ml) |
|---|---|---|---|
| late-methoxy-methyl Acrylamide Copolymer | 10 | 55.7 | 0.575 |

*Intrinsic viscosity is determined at 30°C using a 1N NaNO$_3$ as the solvent.

EXAMPLE 1

Six parts of acid-processed gelatin having an isoelectric point of 7.8 and 6 parts of gum arabic were dissolved in 30 parts of water at 40°C. After adding 0.5 part of Turkey red oil thereto as an emulsifier, 30 parts of dichlorodiphenyl containing 2% of crystal violet lactone (hereinafter referred to as "CVL") was added to the colloid solution under vigorous stirring to emulsify and form an o/w emulsion, the stirring being discontinued when the size of the oil droplets become 6-10$\mu$. To this was added 210 parts of water warmed to 45°C in which 1.35 parts of a 11% aqueous solution of the sodium salt of vinyl acetate-monoethyl maleate copolymer (average molecular weight about 20,000) had been dissolved previously. The pH thereof was then adjusted to 4.5 by adding dropwise 50% acetic acid with a continuation of the stirring. After maintaining the solution at this temperature for 15 minutes with stirring, the vessel was cooled externally to cause gelatin and to solidify the colloid wall. The stirring was continued. At a temperature of 15°C, 3 parts of a 37% formaldehyde solution was added thereto. When the temperature thereof dropped to 10°C, the addition of a 10% sodium hydroxide solution drop by drop was started, which was slowly continued for one day and one night to adjust the pH to 10. This solution was then heated to 50°C over a 20 minute period. The capsules thus obtained were of multinuclear, and the size thereof was greater than 30$\mu$.

The encapsulation of this invention provided capsules having a thick wall membrane and low porosity and, compared with a process in which the sodium salt of vinyl acetate-monoethyl maleate copolymer was not used (described in the specification of the U.S. Pat. No. 2,800,457), the colloid amount contributing to form wall membrane of capsules increased by about 10%.

The process of encapsulation at a high concentration and with a shorttime hardening treatment using a shock-preventing agent has been described. The following Examples 2-7 illustrate the encapsulation process combining these shock-preventing agents and the coacervation inducing agent of this invention.

EXAMPLE 2

Six parts of acid-processed gelatin having an isoelectric point of 7.94 and 6 parts of gum arabic were dissolved in 30 parts of water at 40°C. After adding 0.5 part of Turkey red oil thereto as an emulsifier, 30 parts of dichlorodiphenyl containing 2% of CVL was added to the colloid solution under vigorous stirring to emulsify and form an o/w emulsion, the stirring being discontinued when the size of the oil droplets become 6-10$\mu$. To this was added 180 parts of water warmed to 45°C, in which 1.35 parts of a 11% aqueous solution of sodium salt of vinyl acetate-monoethyl maleate copolymer described in Example 1 had previously been dissolved. The pH thereof was then adjusted to 4.5 by adding dropwise 50% acetic acid with stirring. After maintaining the solution at this temperature for 15 minutes with stirring, the vessel was cooled externally to cause gelation and to solidify the colloid wall. Stirring was continued. When the temperature of the solution dropped to 15°C, 3 parts of a 37% formaldehyde solution was added thereto. At a temperature of 10°C, 25 parts of 5% carboxymethyl cellulose (degree of etherification: 0.75) as the sodium salt was added thereto. The pH of the solution was adjusted to 10 by adding dropwise a 10% sodium hydroxide solution over a 15 minutes period. This solution was then heated at 50°C over a 20 minute period to obtain a solution containing capsules having excellent heat resistant. Almost all of the capsules in this solution were observed as a mononuclear capsules containing one oil droplet. After coating this capsule solution onto a base paper, it was subjected to heat resistance testing for 3 hours in a drying box kept at 150°C. This capsule-coating paper was superposed on a clayed paper and duplicating was done using a ball-point pen to obtain a clear colored mark.

In order to demonstrate the superiority of the encapsulating method in these Examples to conventional encapsulating methods, the result obtained using a process in which sodium salt of vinyl acetate-monoethyl maleate copolymer was not used is set forth in the following table for comparison.

|  | Example 2 | Comparison Example |
|---|---|---|
| Amount of Gelatin Deposited | 93% | 81% |
| Viscosity at 10°C | 30 CP | 75 CP |
| Viscosity upon Adding Alkali Dropwise | 27 CP | 42 CP |

As is obvious from the results contained in the table above, a great advantage is obtained in that the amount deposited increases and in that the viscosity decreases greatly.

Also in the following Examples 3-6, results obtained using processes in which a vinyl acetate-maleic acid copolymer or a derivative thereof is not used are shown in the Tables as comparison examples with respect to the amount deposited and the viscosity.

EXAMPLE 3

To 6 parts of acid-processed gelatin having an isoelectric point of 8.1 add 3 parts of gum arabic was added 6 parts of a 2% aqueous solution of the sodium salt of vinyl acetate-maleic acid copolymer having an average molecular weight of about 230,000, then the resulting mixture was added to 30 parts of water at 40°C. To the colloid solution obtained by adding thereto 0.5 part of Turkey red oil as an emulsifier was added 30 parts of dichlorodiphenyl containing 2% of CVL with vigorous stirring to emulsify and form an o/w emulsion, the stirring being discontinued when the size of the oil droplets therein became 8-10$\mu$ 140 parts of water warmed to 45°C was added thereto. The pH thereof was then adjusted to 4.5 by adding dropwise 50% acetic acid with a continuation of the stirring. The solution was cooled externally of the vessel to 8°C. 3 parts of 37% formaldehyde was poured thereinto and 30 parts of a 5% aqueous solution of cellulose sulfate (degree of esterification: 0.83) was added thereto. The pH of the system was adjusted to 10 by adding a 20% sodium hydroxide aqueous solution dropwise over a 15 minute period. The temperature of the solution was then raised to 50°C by heating to increase the heat resistance of capsules. The capsules thus obtained were mononuclear and no abnormality was observed in heat resistance test.

|  | Example | Comparison Example |
|---|---|---|
| Amount of Gelatin Deposited | 81% | 65% |
| Viscosity at 10°C | 45 CP | 62 CP |
| Viscosity upon Adding Alkali Dropwise | 57 CP | 252 CP |

EXAMPLE 4

6 parts of acid-processed gelatin having an isoelectric point of 7.98 and 6 parts of gum arabic were dissolved in 30 parts of water at 40°C. To the colloid solution obtained by adding thereto 0.5 part of Turkey red oil as an emulsifier was added 30 parts of dichlorodiphenyl containing 2% of CVL under vigorous stirring to emulsify and form an o/w emulsion, the stirring being discontinued when the size of the oil droplets therein became 6–10μ. 180 parts of water warmed to 45°C was added thereto. The pH thereof was then adjusted to 4.3 by adding a 50% sulfuric acid aqueous solution dropwise while continuing the stirring. After maintaining the solution at this temperature for 15 minutes with stirring, the vessel was cooled externally. Stirring was continued. When the temperature of the solution dropped to 17°C, 10 parts of a 2% aqueous solution of the sodium salt of a vinyl acetate-monoethyl maleate copolymer having an average molecular weight of about 110,000 was added thereto and, when the temperature dropped to 15°C, 3 parts of 37% formaldehyde solution was added thereto. When the temperature thereof further dropped to 10°C, 35 parts of 5% aqueous pectic acid solution was added thereto. The pH thereof was then adjusted to 10 by adding a 10% sodium hydroxide aqueous solution dropwise over a 15 minutes period. Furthermore, the temperature of this solution was raised to 50°C over a 20 minute period with stirring to obtain mononuclear capsules excellent in heat resistance.

EXAMPLE 5

30 parts of a mixed oil comprising chlorinated paraffin (Trade Mark: TOYOPARAX A–40, chlorine content being 4%, made by Toyo Soda Manufacturing Co., Ltd.) and kerosene (weight ratio being 4:1) was emulsified into a colloid sol comprising 4 parts of gum arabic, 0.5 part of a vinyl acetate-maleic acid copolymer (Trade Mark; TAMANORI NH, made by ArakawaRinsan Chemical Co., Ltd. containing 20.5% of solid ingredients, viscosity at 25°C being 250 CP) and 25 parts of warm water to form an o/w emulsion. Stirring was discontinued when maximum grain diameter of the oil droplets became 10μ. This solution was added to a gelatin solution comprising 6 parts of acid-processed gelatin having an isoelectric point of 7.9 and 165 parts of water warmed to 45°C. The pH thereof was adjusted to a 4.2 by adding a 5% aqueous succinic acid solution with stirring. The solution was cooled externally of the vessel under slow stirring to cause gelation and to solidify the coacervate wall membrane. Three parts of 30% glutaraldehyde was added thereto at a solution temperature of 10°C, 30 parts of a 5% aqueous cellulose phosphate solution (degree of esterification being 0.85) was then added thereto. The pH of the system was adjusted to 10 by adding dropwise a 20% aqueous pottassium hydroxide solution over a 10 minute period. The capsule solution was heated to 50°C to obtain hardened capsules.

|  | Example 5 | Comparison Example |
|---|---|---|
| Amount of Gelatin Deposited | 87% | 72% |
| Viscosity at 10°C | 50 CP | 70 CP |
| Viscosity upon Adding Alkali Dropwise | 64 CP | 170 CP |

EXAMPLE 6

Example 3 was duplicated except that 135 parts of water was added for dilution that the pH was adjusted to 4.2, and that 40 parts of 5% sodium nucleate aqueous solution was used. The capsules thus obtained were mononuclear and no abnormality was observed in the heat resistance test.

EXAMPLE 7

6 parts of acid-processed gelatin having an isoelectric point of 7.8 and 6 parts of gum arabic were dissolved in 30 parts of water at 40°C. After adding 0.5 part of Turkey red oil thereto as an emulsifier, 30 parts of dichlorodiphenyl containing 2% of CVL was added to the colloid solution under vigorous stirring to being discontinued when the size of the oil droplets became 6–10μ. To this was added 210 parts of water warmed to 45°C, in which 1.0 part of a 5% aqueous solution of potassium polyvinylbenzene sulfonate had been dissolved previously. The pH thereof was then adjusted to 4.5 by adding dropwise a 50% acetic acid with a continuation of the stirring. After maintaining the solution at this temperature for 15 minutes with stirring, the vessel was cooled externally to cause gelation and to solidify the colloidal wall. Stirring was continued. When the temperature of the solution dropped to 15°C, 3 parts of a 37% formaldehyde solution was added thereto. When the temperature thereof further dropped to 10°C, the addition of a 10% sodium hydroxide solution drop by drop was started, which was slowly continued for one day and one night to adjust the pH to 10. This solution was then heated to 50°C over a 20 minute period. The capsules thus obtained were of multiple nuclear, and the size thereof was more than 30μ.

The encapsulation of this invention provided capsules having thick wall membrane and low porosity and, compared with a process in which potassium polyvinylbenzenesulfonate was not used (described in the specification of the U.S. Pat. No. 2,800,457), the colloid amount contributing to form wall membrane of capsules increased by 13%.

We have already presented the process of the encapsulation at high concentration and a short-time hardening treatment using a shock-preventing agent. The following Examples 8–12 illustrate the encapsulating process combining these shock-preventing agents and the coacervation inducing agent of this invention.

EXAMPLE 8

Six parts of acid-processed gelatin having an isoelectric point of 7.94 and 6 parts of gum arabic were dissolved in 30 parts of water at 40°C. After adding 0.5 part of Turkey red oil thereto as an emulsifier, 30 parts of dichlorodiphenyl containing 2% of CVL was added to the colloid solution under vigorous stirring to emulsify and form an o/w emulsion, the stirring being discontinued when the size of the oil droplets became 6–10μ. To this was added 180 parts of water warmed to 45°C, in which 1.2 parts of a 10% aqueous solution of potassium vinylbenzenesulfonate-acryloylmorpholine copolymer (Copolymer No. 1 in Table 1) had been dissolved previously. The pH was then adjusted to 4.5 by adding 50% acetic acid dispersed with stirring. After maintaining the solution at this temperature for 15 minutes under stirring, the vessel was cooled externally to cause gelation and to solidify the colloidal wall deposited. Stirring was continued. When the temperature of the solution dropped to 15°C, 3 parts of a 37% formaldehyde solution was added thereto. When the temperature thereof further dropped to 10°C, 25 parts of 5% carboxymethyl cellulose (usually marketed as the sodium salt) aqueous solution (degree of etherification: 0.75) was added thereto. The pH of the solution was adjusted to 10 by adding dropwise a 10% sodium hydroxide solution over a 15 minute period. This solution was then heated to 50°C with stirring over a 20 minute period to obtain a solution containing capsules having excellent heat resistance. Almost all of the capsules in this solution were observed through a microscope to be mononuclear capsules of one oil droplet emulsified. After coating this capsule solution onto a base paper, it was subjected to a heat resistance test for 3 hours in a drying box kept at 150°C. This capsule-coated paper was super-posed on a clayed paper and duplicating was conducted using a ballpoint pen to obtain a clear colored mark.

In order to explain the superiority of the encapsulating method in this Example to the conventional encapsulating method, the process in which potassium vinylbenzenesulfonate-acryloylmorpholine copolymer is not used is set forth below as an comparison example.

|  | Example 8 | Comparison Example |
|---|---|---|
| Amount of Gelatin Deposited | 93% | 81% |
| Viscosity at 10°C | 12 CP | 75 CP |
| Viscosity upon Adding Alkali Dropwise | 26 CP | 42 CP |

As is obvious from the results contained in the table above, a great advantage is obtained in that the amount deposited increases and in that the viscosity decreases greatly.

Also in the following Examples 9–12, processes in which potassium vinylbenzenesulfonate copolymer is not used are set forth in the Tables as comparison examples with respect to the amount deposited and the viscosity.

EXAMPLE 9

To 6 parts of acid-processed gelatin having an isoelectric point of 8.1 and 3 parts of gum arabic was added 2 parts of an 8% aqueous solution of potassium vinylbenzenesulfonate-acrylamide copolymer (Copolymer No. 2 of Table 1), then the resulting mixture was added to 30 parts of water at 40°C. To the colloid solution obtained by adding thereto 0.5 part of Turkey red oil as an emulsifier was added 30 parts of dichlorodiphenyl containing 2% of CVL under vigorous stirring to emulsify and form as o/w emulsion, stirring being discontinued when the size of the oil droplets therein became 8–10μ. 140 parts of water warmed to 45°C was added thereto. The pH was then adjusted to 4.5 by adding 50% acetic acid dropwise with a continuation of the stirring. The solution was cooled to 8°C. 3 parts of 37% formaldehyde was poured thereinto and 30 parts of 5% aqueous solution of cellulose sulfate (degree of esterification: 0.83) was added thereto. The pH of the system was adjusted to 10 by adding a 20% aqueous sodium hydroxide solution dropwise over a 15 minute period. The temperature of the solution was raised to 50°C by heating to increase the heat resistance of the capsules. The capsules thus obtained were mononuclear and no abnormality was observed in the heat resistance test.

|  | Example 9 | Comparison Example |
|---|---|---|
| Amount of Gelatin Deposited | 84% | 65% |
| Viscosity at 10°C | 25 CP | 62 CP |
| Viscosity upon Adding Alkali Dropwise | 41 CP | 252 CP |

EXAMPLE 10

Six parts of acid-processed gelatin haivng an isoelectric point of 7.98 and 6 parts of gum arabic were dissolved in 30 parts of water at 40°C. To the colloid solution obtained by adding thereto 0.5 part of a Turkey red oil as an emulsifier was added 30 parts of dichlorodiphenyl containing 2% of CVL under vigorous stirring to emulsify and form an o/w emulsion, the stirring being discontinued when the size of the oil droplets therein became 6–10μ. 180 parts of water at 45°C was added thereto. The pH thereof was then adjusted to 4.3 by adding a 10% aqueous sulfuric acid solution dropwise with the stirring being continued. After maintaining the solution at this temperature for 15 minutes under stirring, the vessel was cooled from outside. Stirring was continued. When the temperature of the solution dropped to 17°C, 4 parts of a 5% aqueous solution of potassium vinylbenzenesulfonate-vinylpyrrolidone copolymer (Copolymer No. 3) was added thereto and, when the temperature dropped to 15°C, 3 parts of a 37% formaldehyde solution was added thereto. When the temperature thereof further dropped to 10°C, 35 parts of a 5% aqueous pectic acid solution was added thereto. The pH thereof was then adjusted to 10 by adding dropwise a 10 % aqueous sodium hydroxide solution over a 15 minute period. Furthermore, the temperature of this solution was raised to 50°C over a 20 minute period with stirring to obtain mononuclear capsules excellent in heat resistance.

EXAMPLE 11

30 parts of a mixed oil comprising a chlorinated paraffin (Trademark: TOYOPARAX A-40, the chlorine content being 40%, made by Toyo Soda manufacturing CO., Ltd) and kerosene (4:1) containing 2% of CVL therein was emulsified in a colloid sol comprising 4 parts of gum arabic, 0.8 part of a 10% aqueous solution of potassium vinylbenzenesulfonate-morpholinomethylacrylamide copolymer (Co-polymer No. 4) and 25 parts of warm water to form an o/w emulsion. Stirring was discontinued when the maximum grain diameter of the oil droplets became 10μ. This solution was added to a gelatin solution comprising 6 parts of an acid-processed gelatin having an isoelectric point of 7.9 and 165 parts of water warmed to 45°C. The pH thereof was adjusted to 4.2 by adding a 5% aqueous succinic acid solution with stirring. The solution was cooled externally with slow stirring to cause gelation and to solidify the coacervate wall membrane. Three parts of 30% glutaraldehyde was added thereto at 10°C, 30 parts of a 5% aqueous cellulose phosphate solution (degree esterification: 0.85) was then added thereto. The pH of the system was adjusted to pH 10 by adding dropwise a 20% aqueous potassium hydroxide solution over a 10 minute period. The capsule solution was heated to 50°C to obtain hardened capsules.

|  | Example 11 | Comparison Example |
|---|---|---|
| Amount of Gelatin Deposited | 88% | 72% |
| Visocity at 10°C | 34 CP | 70 CP |
| Viscosity upon Adding Alkali Dropwise | 52 CP | 170 CP |

EXAMPLE 12

Example 3 was duplicated except that 2.5 parts of a 5% aqueous solution of potassium vinylbenzenesulfonate-methoxymethyl acrylamide copolymer (Copolymer No. 5) was used instead of 2 parts of an 8% aqueous solution of potassium vinylbenzenesulfonate-acrylamide copolymer and that 40 parts of a 5% aqueous sodium nucleate solution was used as a shock-preventing agent, using 135 parts of water for dilution and adjusting the pH to 4.2. The capsules thus obtained were of mononuclear and no abnormality was observed in the heat resistance test.

EXAMPLE 13

Six parts of acid treated gelatin having an isoelectric point of 7.8 and 6 parts of gum arabic were dissolved in water at 40°C and then 0.5 parts of Turkey red oil were added as the emulsifier. To this solution, a 2% solution of dissolved in 30 parts of dichlorodiphenyl was added with vigorous stirring to form an o/w emulsion. The stirring was stopped when the oil droplet size became 6–10μ.

Five parts of a 3% aqueous solution of a sodium acrylate-acryloyl morpholine copolymer (Copolymer No. 6 in Table 2) were added to water at 45°C to produce 210 parts of a warm solution. This solution was added to the above described o/w emulsion. 50% acetic acid was then added dropwise with stirring to adjust the pH to 4.5. After stirring at this temperature for 15 minutes, the mixture was cooled externally to gel the deposited wall membrane. The stirring was continued. When the temperature of the solution became 15°C, 3 parts of a 37% formaldehyde solution were added. When the temperature of the solution became 10°C, a 10% sodium hydroxide solution was added dropwise over a period of one day and one night to adjust the pH to 10 with stirring. This solution was warmed to 50°C over a 20 minute period. The resulting capsules were polynuclear particles having a particle size of greater than 30μ.

When the capsule formation was carried out by this example, the amount of the colloid which contributed to formation of the cell membrane increased approximately 10% as compared with that of the process in which the sodium acrylate-acryloyl morpholine copolymer was not used (U.S. Pat. No. 2,800,457), and the resulting capsules had a thick cell membrane of a low porosity.

The process for encapsulation at a high concentration and with hardening for a short period of time using a shock-preventing agent has been presented. In the following Examples 14–17, a process for producing capsules in which the shock-preventing agent and the coacervation inducing agent of the present invention are used together is shown.

EXAMPLE 14

Six parts of acid treated gelatin having a isoelectric point of 7.94 and 6 parts of gum arabic were dissolved in 30 parts of water at 40°C, and 0.5 parts of Turkey red oil were added as the emulsifier. To this colloid solution a 2% solution of CVL dissolved in 30 parts of dichlorodiphenyl was added with vigorous stirring to form an o/w emulsion. The stirring was stopped when the oil droplet size became 6–10μ. Water was added to 5 parts of a 3% aqueous solution of sodium acrylate-acryloyl morpholine copolymer as described in Example 13 at 45°C to prepare 180 parts of a warm solution. This solution was added to the above o/w emulsion. 50% acetic acid was then added dropwise with stirring to adjust the ph to 4.5. After stirring at this temperature for 15 minutes, the mixture was cooled externally to gel the deposited wall membrane. The stirring was continued. When the temperature of the solution became 15°C, 3 parts of a 37% formaldehyde solution were added. When the temperature of the solution became 10°C, 25 parts of a 5% aqueous solution of carboxymethyl cellulose (as the sodium salt) (degree of etherification; 0.75) were added 10% sodium hydroxide solution was then added dropwise with stirring over a 10 minute period. The solution was heated again to 50°C over a 20 minute period with stirring to obtain a solution of capsules having excellent heat resistance. On observation with a microscope this capsule solution consisted of mononuclear capsules. After applying this capsule solution to paper, the paper was subjected to a heat resisting test for 3 hours at 150°C in a drying box. This capsule paper was superposed on a clay coated paper and written on using a ball-point pen, by which a distinct colored copy was formed on the clay coated paper.

In order to demonstrate that the capsule formation process of this example was superior to the prior process, the following table is shown in which a process of not using the sodium acrylate-acryloyl morpholine copolymer is shown for comparison.

|  | Example 14 | Comparison Example |
|---|---|---|
| Amount of Gelatin Deposited | 90% | 81% |
| Viscosity at 10°C | 25 CP | 75 CP |
| Viscosity on Adding Alkali Dropwise | 32 CP | 42 CP |

As is clear from the results contained in this table, the present invention is advantageous in that the amount deposited increases and the viscosity decreases remarkably.

In the following example, the amount deposited and the viscosity are compared with those obtained with the process in which the copolymer of sodium acrylate is not used, the results of which are shown in the table.

EXAMPLE 15

Two parts of a 5% aqueous solution of a sodium acrylate-acrylamide copolymer (Copolymer No. 7) were added to a mixture of 6 parts of acid treated gelatin having an isoelectric point of 8.1 and 3 parts of gum arabic. The mixture was dissolved in 30 parts of water, and 0.5 parts of Turkey red oil were added as the emulsifier. A 2% solution of CVL dissolved in 30 parts of dichlo-rodiphenyl was added to the above colloid solution with vigorous stirring to form an o/w emulsion. The stirring was stopped when the oil droplet size became 8–10$\mu$. To this solution, 140 parts of water at 40°C were added. Then 5% acetic acid was added dropwise with stirring to adjust the pH to 4.5. The solution was cooled externally to reduce the temperature of the solution to 8°C. Then, 3 parts of 37% formaldehyde and 30 parts of a 5% cellulose sulfate solution (degree of esterification: 0.83) were added thereto in turn. The pH of the system was adjusted to 10 by adding a 20 % aqueous sodium hydroxide solution dropwise over a 15 minute period. The solution was heated to 50°C, by which the heat-resistance of the capsules increased. The resulting capsules were mononuclear and an abnormal phenomenon in the heat resistance test was not observed.

|  | Example 15 | Comparison Example |
|---|---|---|
| Amount of Gelatin Deposited | 81% | 65% |
| Viscosity at 10°C | 33 CP | 62 CP |
| Viscosity upon Adding Alkali Dropwise | 57 CP | 252 CP |

EXAMPLE 16

Six parts of acid treated gelatin having an isoelectric point of 7.98 and 6 parts of gum arabic were dissolved in 30 parts of water at 40°C, and then 0.5 parts of Turkey red oil were added as the emulsifier. 30 parts of a 2% solution of CVL dissolved in dichlorodiphenyl were added to the above colloid solution with vigorous stirring to produce an o/w emulsion. The stirring was stopped when the oil droplet size became 6–10$\mu$. To this solution, 180 parts of water at 45°C were added. Then a 10% aqueous solution of sulfuric acid was added dropwise with stirring to adjust the pH to 4.3. After stirring for 15 minutes at this temperature, the solution was cooled externally. The stirring was continued. When the temperature of the solution became 17°C, 4 parts of a 5% aqueous solution of a sodium methacrylate-vinylpyrrolidone copolymer (Copolymer No, 8) were added. When the temperature became 15°C, 3 parts of a 37% formaldehyde solution were added. When the temperature became 10°C, 35 parts of a 5% aqueous pectinic acid solution were added. To this solution, a 10% aqueous solution of sodium hydroxide was added dropwise over a 15 minute period so as to adjust the pH to 10.

The temperature of the solution was raised again to 50°C over a 20 minute period was stirring, by which a solution of mononuclear capsules which had excellent heat resistance was obtained.

EXAMPLE 17

30 parts of a n/oil mixture composed of chlorinated paraffin (Trade mark: Toyoperlax A-40; chlorine content: 40%, produced by Toyo Soda Manufacturing Co., Ltd.) and kerosene (ratio by weight: 4:1) in which 2% of CVL was included were emulsified in a colloid sol consisting of 4 parts of gum arabic, 4 parts of a 2% aqueous solution of a sodium acrylate-morpholinomethyl acrylamide copolymer (Copolymer No. 9) and 25 parts of warm water to produce an o/w emulsion. The stirring was stopped when the maximum oil droplet size became 10$\mu$. This was added to an aqueous gelatin solution composed of 6parts of acid treated gelatin having an isoelectric point of 7.9 and 165 parts of water of 45°C. The pH was adjusted to 4.2 by adding a 5% aqueous solution of succinic acid with stirring. The solution was cooled externally with stirring slowly to gelatinize and solidify the coacervate wall membrane. When the temperature became 10°C, 3 parts of 30% glutaraldehyde were added, and then 30 parts of a 5% aqueous solution of cellulose phosphate (degree of esterification: 0.85) were added. The pH of the system was adjusted to 10 by adding dropwise a 20% aqueous solution of potassium hydroxide. The capsule solution was warmed to 50°C to produce hardened capsules.

|  | Example 17 | Comparison Example |
|---|---|---|
| Amount of Gelatin Deposited | 85% | 72% |
| Viscosity at 10°C | 34 CP | 70 CP |
| Viscosity upon Adding Alkali Dropwise | 52 CP | 170 CP |

EXAMPLE 18

The same procedure as in Example 14 was carried out using 9 parts of a 2% aqueous solution acrylate-methoxymethyl acrylamide copolymer (Copolymer No. 10) instead of 2 parts of 5% aqueous solution of the sodium acrylate-acrylamide copolymer of Example 14 and used 40 parts of a 5% aqueous solution of the sodium salt of nucleic acid as the shock preventing solution and 135 parts of diluting water at pH 4.2. The resulting capsules were mononuclear and an abnormal phenomenon was not observed in a heat resistance test.

What is claimed is:

1. In a process for preparing microscopic capsules containing hydrophobic oil droplets therein comprising
   1. emulsifying a water-immiscible oil in an aqueous solution of at least one hydrophilic colloid which is ionizable in water to obtain a first sol, and then mixing said first sol with an aqueous solution of a hydrophilic colloid which is ionizable in water and has an electric charge opposite that of said first sol, one of said sols being positively charged, or emulsifying a water-immiscible oil in an aqueous solution of hydrophilic colloids which are ionizable in water and at least one of which is positively charged, one of the hydrophilic colloids being relatively negatively charged,
2. adding water thereto, adjusting pH thereof, or adding water thereto and adjusting the pH thereof, to obtain coacervates wherein complex colloids are deposited around individual oil droplets,
3. cooling to gel the resulting coacervates,
4. adjusting the pH thereof to from 9 to 11, and
5. hardening said coacervate,
the improvement comprising adding prior to step (3) a compound selected from the group consisting of (a) a vinyl acetate-maleic acid copolymer and derivatives thereof having the following repeating units:

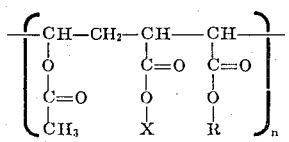

wherein R represents a hydrogen atom, an alkyl group or an alkali metal atom, and X represents a hydrogen atom or an alkali metal atom, except that when R is an alkyl group X is an alkali metal atom and $n$ represents the degree of polymerization and ranges such that the average molecular weight of the copolymer is about 500 to about 500,000 (b) a polyvinyl benzene sulfonate having repeating units of the following general formula:

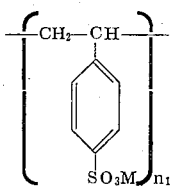

wherein M represents an alkali metal atom and wherein $n_1$ represents the degree of polymerization and ranges such that the average molecular weight of the copolymer is from about 1,000 to about 3,000,000, or a copolymer of vinylbenzene sulfonate and a member selected from the group consisting of acryloylmorpholine, morpholino alkyl acrylamide, acrylamide, vinylpyrrolidone and alkoxyalkyl acrylamide and (c) a copolymer of acrylic acid or methacrylic acid and a member selected from the group consisting of acryloyl morpholine, morpholino-alkyl acrylamide, acrylamide, vinyl-pyrrolidone and alkoxyalkyl acrylamide or the salts of said copolymers of acrylic or methacrylic acid,
said compound selected from among (a), (b) and (c) being present in an amount sufficient to induce coacervation without becoming a predominant part of the main wall membrane of said microcapsules to prepare microscopic capsules encapsulated with a thick wall membrane having a low degree of porosity.

2. The process of claim 1, wherein said vinyl acetate-maleic acid copolymer has an average molecular weight ranging from about 5,000 to about 300,000.

3. The process of claim 1, wherein said polyvinyl benzene sulfonate or copolymer of vinylbenzene sulfonate has a molecular weight ranging from 10,000 to 3 million.

4. The process of claim 1, wherein said polyvinyl benzene sulfonate or copolymer of vinylbenzene sulfonate has a molecular weight ranging from 100,000 to 1 million.

5. The process of claim 1, wherein said copolymer of vinylbenzene sulfonate contains more than about 50 mole percent vinylbenzene sulfonate.

6. The process of claim 1, wherein said copolymer of acrylic acid or methacrylic acid has a molecular weight ranging from about 6,000 to about 2 million.

7. The process of claim 1, wherein said copolymer of acrylic acid or methacrylic acid has a molecular weight ranging from about 50,000 to about 1 million.

8. The process of claim 1, wherein said copolymer of acrylic acid or methacrylic acid contains more than about 50 mole percent acrylic acid or methacrylic acid.

9. The process of claim 1, wherein said positively charged colloid is gelatin.

10. The process of claim 9, wherein said colloid other than gelatin is selected from the group consisting of agar-agar, casein, alginate, gum arabic, and carrageein.

11. The process of claim 1, wherein said oil is selected from the group consisting of mineral oils, animal oils, vegetable oils and synthetic oils.

12. The process of claim 1, wherein said vinyl acetate-maleic acid copolymer is added at a level ranging from about one four-hundredth to one-tenth by weight to the total amount of the hydrophilic colloids present.

13. The process of claim 12, wherein said vinyl acetate-maleic acid copolymer is added at a level ranging from about one one-hundred-sixtieth to one one-hundred-thirtieth 14. The process of claim 1, wherein said polyvinyl benzene sulfonate or copolymer of vinylbenzene sulfonate is added at a level of about one one-thousandth to about one-tenth by weight to the total amount of the hydrophilic colloids present.

15. The process of claim 14, wherein said polyvinyl benzene sulfonate or copolymer of vinylbenzene sulfonate is added at a level of about one six-hundredth to about one-thirtieth.

16. The process of claim 1, wherein said copolymer of acrylic acid or methacrylic acid is added at a level of about one four-hundredth to about one-tenth by weight to the total amount of the hydrophilic colloids present.

17. The process of claim 16, wherein said copolymer of acrylic acid or methacrylic acid is added at a level of about one one-hundred-sixtieth to about one-thirtieth.

18. The process of claim 1, wherein said vinyl acetate-maleic acid copolymer is a vinyl acetate-monoethyl maleate copolymer, or a vinylacetate-monomethyl maleate copolymer.

19. The process of claim 1, wherein said alkoxyalkylacrylamide is methoxymethyl acrylamide, and wherein said morpholino-alkylacrylamide is morpholino methylacrylamide.

* * * * *